United States Patent
Goodwin et al.

(10) Patent No.: US 6,811,884 B2
(45) Date of Patent: Nov. 2, 2004

(54) WATER REPELLANT SURFACE TREATMENT AND TREATED ARTICLES

(75) Inventors: George B. Goodwin, Cranberry Township, PA (US); Chia-Cheng Lin, Allison Park, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 10/328,804

(22) Filed: Dec. 24, 2002

(65) Prior Publication Data

US 2004/0121168 A1 Jun. 24, 2004

(51) Int. Cl.⁷ ............................................. B32B 9/04
(52) U.S. Cl. .................... 428/447; 428/428; 428/448; 528/39; 528/42
(58) Field of Search ................. 428/428, 447, 428/448; 528/39, 42; 106/13

(56) References Cited

U.S. PATENT DOCUMENTS

| | | | |
|---|---|---|---|
| 4,024,306 A | * 5/1977 | Takamizawa et al. | 427/387 |
| 4,504,109 A | 3/1985 | Taga et al. | 350/1.6 |
| 4,610,771 A | 9/1986 | Gillery | 204/192.1 |
| 4,716,086 A | 12/1987 | Gillery et al. | 428/630 |
| 4,746,347 A | 5/1988 | Sensi | 65/94 |
| 4,792,536 A | 12/1988 | Pecoraro et al. | 501/70 |
| 4,806,220 A | 2/1989 | Finley | 204/192.27 |
| 4,834,857 A | 5/1989 | Gillery | 204/192.27 |
| 4,898,789 A | 2/1990 | Finley | 428/623 |
| 4,898,790 A | 2/1990 | Finley | 428/623 |
| 4,902,580 A | 2/1990 | Gillery | 428/623 |
| 4,948,677 A | 8/1990 | Gillery | 428/623 |
| 4,952,423 A | 8/1990 | Hirata et al. | 427/109 |
| 5,028,579 A | 7/1991 | Inui et al. | 503/201 |
| 5,028,759 A | 7/1991 | Finley | 219/203 |
| 5,059,295 A | 10/1991 | Finley | 204/192.27 |
| 5,240,886 A | 8/1993 | Gulotta et al. | 501/70 |
| 5,250,322 A | * 10/1993 | Takahashi et al. | 427/226 |
| 5,328,768 A | 7/1994 | Goodwin | 428/428 |
| 5,385,872 A | 1/1995 | Gulotta et al. | 501/71 |
| 5,393,593 A | 2/1995 | Gulotta et al. | 428/220 |
| 5,523,161 A | 6/1996 | Goodwin | 428/421 |
| 5,523,162 A | 6/1996 | Franz et al. | 428/421 |
| 5,653,903 A | 8/1997 | Pinchok, Jr. et al. | 219/203 |
| 5,674,967 A | 10/1997 | Goodwin | 528/42 |
| 5,688,864 A | 11/1997 | Goodwin | 524/858 |
| 5,707,740 A | 1/1998 | Goodwin | 428/410 |
| 5,821,001 A | 10/1998 | Arbab et al. | 428/623 |
| 5,854,169 A | 12/1998 | Heller et al. | 502/242 |
| 5,873,203 A | 2/1999 | Thiel | 52/172 |
| 5,980,990 A | 11/1999 | Goodwin | 427/309 |
| 6,001,485 A | * 12/1999 | Kobayashi et al. | 428/428 |
| 6,013,372 A | 1/2000 | Hayakawa et al. | 428/411.1 |
| 6,025,025 A | 2/2000 | Bartrug et al. | 427/302 |
| 6,027,766 A | 2/2000 | Greenberg et al. | 427/226 |
| 6,054,227 A | 4/2000 | Greenberg et al. | 428/701 |
| 6,077,492 A | 6/2000 | Anpo et al. | 423/239.1 |
| 6,465,108 B1 | * 10/2002 | Kamitani et al. | 428/448 |
| 6,641,654 B2 | * 11/2003 | Akamatsu et al. | 106/287.14 |

FOREIGN PATENT DOCUMENTS

DE 19606011 A1 * 8/1997 ............ C09D/5/16

* cited by examiner

Primary Examiner—Margaret G. Moore
Assistant Examiner—Marc S Zimmer
(74) Attorney, Agent, or Firm—Jacques B. Miles

(57) ABSTRACT

A method is provided for applying a water repellant coating over a substrate surface. The surface is contacted with at least one coating composition including at least one perfluoroalkylalkylsilane, at least one hydrolyzable primer, e.g., a silane and/or siloxane, and at least one non-halogenated, e.g., non-fluorinated, alkylsilane. The perfluoroalkylalkylsilane and non-fluorinated alkylsilane can be selected such that the effective chain length of the non-fluorinated alkylsilane is equal to or longer than the effective chain length of the perfluoroalkylalkylsilane.

51 Claims, 1 Drawing Sheet

WATER REPELLANT SURFACE TREATMENT AND TREATED ARTICLES

BACKGROUND OF THE INVENTION

1. Field of the Invention

The present invention relates generally to the field of surface treatment and, more particularly, to methods of producing a water repellent surface on various substrates and to the substrates made thereby.

2. Technical Considerations

Water repellant surface treatments are known in the art. For example, U.S. Pat. Nos. 5,707,740 and 5,980,990 disclose water repellant coating compositions having a perfluoroalkylalkylsilane and an optional integral primer, such as a completely hydrolyzable silane or siloxane. These references also disclose activating the substrate with an acid prior to forming the water repellant coating over the substrate.

U.S. Pat. No. 6,025,025 discloses a method of improving the durability of a water repellant coating on a substrate surface by first applying a dispersion of an abrasive material in an acid solution to expose an increased number of bonding sites on the surface.

Other water repellant coatings are disclosed, for example, in U.S. Pat. Nos. 5,523,161; 5,674,967; 5,328,768; and 5,688,864.

These known compositions and methods provide durable coatings having excellent water repellant properties. Typically, these known water repellant coatings provide contact angles with water on the order of 100° or more. Such high water contact angles promote the beading of water droplets on the coated surface. However, high contact angles alone may not directly correlate to how quickly the water beads slide off of the coated surface. As will be appreciated by one skilled in the art, it is desirable that the water beads slide off of the coated surface as quickly as possible. For automotive transparencies, for example, the faster the water beads slide off of the coated transparency the faster acceptable vision through the article can be restored.

One conventional method of characterizing how quickly a water droplet slides off of a substrate is by the conventional "water sliding angle" measurement. The lower the water sliding angle, the faster the water droplets slide off of the surface. Known water repellant coatings typically have water sliding angles on the order of 22° or more.

Therefore, it would be desirable to provide water repellant coating compositions and/or coating methods that not only provide commercially acceptable durability, e.g., durability similar to known water repellant coatings, but which also provide lower water sliding angles than known water repellant coatings.

SUMMARY OF THE INVENTION

A method of applying a water repellant coating over a substrate surface in accordance with the invention comprises contacting the surface with at least one coating composition comprising at least one perfluoroalkylalkylsilane, at least one integral primer, such as a hydrolyzable silane or siloxane, and at least one substantially non-halogenated, e.g., substantially non-fluorinated, alkylsilane. The method can include contacting the surface with a first coating composition comprising at least one perfluoroalkylalkylsilane and contacting the surface with a second coating composition comprising a substantially non-fluorinated alkylsilane. The first and/or second coating compositions can also include at least one integral primer, such as a hydrolyzable silane or siloxane. Suitable non-fluorinated alkylsilanes include branched or normal alkylsilanes. The non-fluorinated alkylsilane can be selected such that the effective chain length of the non-fluorinated alkylsilane is equal to or longer than the effective chain length of the perfluoroalkylalkylsilane.

A coated article of the invention comprises a substrate having at least one surface and a coating applied over at least a portion of the surface. The coating can be formed from at least one coating composition of the invention comprising at least one substantially non-halogenated, e.g., substantially non-fluorinated, alkylsilane having the general formula $R^4_t SiR^5_u Y_{4-t-u}$, where $R^4$ can be an alkyl moiety having the general formula $C_p H_{2p+1}$, Y can be a hydrolyzable moiety, such as one or more halogen, acyloxy, and/or alkoxy moieties, and $R^5$ can be an alkyl moiety, such as methyl, ethyl, propyl, butyl, and the like having the general formula $C_n H_{2n+1}$, or a alkenyl moiety having the general formula $C_n H_{2n-1}$, such as a vinyl moiety. In one aspect, t can be 1, 2, or 3; u can be 0, 1, or 2; and t+u is less than 4. The coating can comprise the reaction product of (1) the at least one substantially non-halogenated alkyl silane, (2) at least one perfluoroalkylalkylsilane having the general formula $(R^1 R^2)_m SiR^3_n X_{4-m-n}$, where $R^1$ is a perfluoroalkyl moiety having the general formula $C_q F_{2q+1}$, $R^2$ is a bisubstituted organic radical having the general formula $.(C_s H_{2s}).$, $R^3$ is an alkyl moiety, such as methyl, ethyl, propyl, butyl, and the like, having the general formula $C_n H_{2n+1}$, or a alkenyl moiety having the general formula $C_n H_{2n-1}$, such as a vinyl moiety, and X can be one or more hydrolyzable moieties, such as halogen, acyloxy, and/or alkoxy moieties, and (3) at least one integral primer, such as at least one hydrolyzable, e.g., completely hydrolyzable, silane having the general formula $SiZ_4$, and/or such as siloxane having the formula $Si_v O_w Z_{(4v-2w)}$. In (3) above for the formula $SiZ_4$ Z can be one or more hydrolyzable groups of halogen, alkoxy, and/or acyloxy moieties. Suitable silanes can be selected from those wherein Z is, for example chloro, bromo, iodo, methoxy, ethoxy and acetoxy. Suitable examples of hydrolyzable silanes include tetrachlorosilane, tetramethoxysilane and tetraacetoxysilane. In (3) above for the formula $Si_v O_w Z_{(4v-2w)}$, Z is selected from the group of halogen, alkoxy and acyloxy groups, v is two or more, and w is one or more and (4v−2w) is greater than zero. Suitable hydrolyzable siloxanes include hexachlorodisiloxane, octachlorotrisiloxane and higher oligomer chlorosiloxanes. These silanes and siloxanes are further described in U.S. Pat. No. 6,025,025, which is incorporated by reference herein. In one embodiment for (2) above, m can be 1, 2, or 3; n can be 0, 1, or 2; and m+n is less than 4. The water repellant coating can provide the coated article with a water sliding angle of less than 22°, such as less than 20°, such as less than 15°, such as in the range of greater than 0° to 15°.

Another coated article comprises a substrate having at least one surface and a coating applied over at least a portion of the surface. The coating can be formed from a coating composition comprising at least one perfluoroalkylalkylsilane having a first effective chain length and at least one substantially non-halogenated, e.g., substantially non-fluorinated, alkylsilane having a second effective chain length. The second effective chain length can be longer than the first effective chain length. The coating composition can also include at least one integral primer, such as at least one hydrolyzable, e.g., completely hydrolyzable, silane or siloxane.

A coating system, such as a coating kit, of the invention for applying a water repellant coating over a substrate comprises at least one coating composition comprising at least one perfluoroalkylalkylsilane, at least one primer, such as at least one hydrolyzable silane or siloxane, and at least one substantially non-halogenated, e.g., substantially non-fluorinated, alkylsilane. For example, the coating system can comprise a first coating composition comprising at least one perfluoroalkylalkylsilane and a second coating composition comprising at least one substantially non-halogenated, e.g., substantially non-fluorinated, alkylsilane. Either the first or second coating composition can also include an integral primer, such as a hydrolyzable silane or siloxane.

DESCRIPTION OF THE INVENTION

Figure 1:
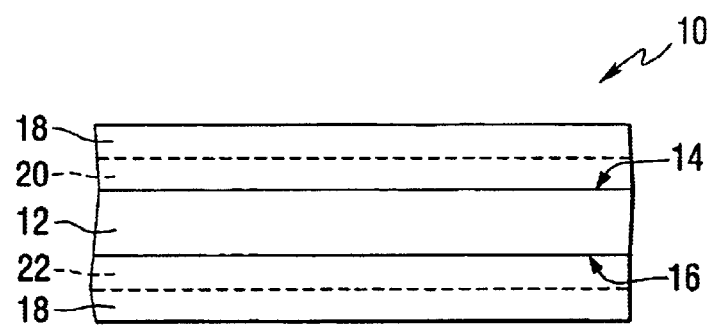
FIG. 1 is a side, sectional view (not to scale) of a portion of a coated article incorporating features of the invention.

As used herein, spatial or directional terms, such as "inner", "outer", "above", "below", "top", "bottom", and the like, relate to the invention as it is shown in the drawing figures. However, it is to be understood that the invention may assume various alternative orientations and, accordingly, such terms are not to be considered as limiting. Further, all numbers expressing dimensions, physical characteristics, processing parameters, quantities of ingredients, reaction conditions, and the like used in the specification and claims are to be understood as being modified in all instances by the term "about". Accordingly, unless indicated to the contrary, the numerical values set forth in the following specification and claims are approximations that may vary depending upon the desired properties sought to be obtained by the present invention. At the very least, and not as an attempt to limit the application of the doctrine of equivalents to the scope of the claims, each numerical value should at least be construed in light of the number of reported significant digits and by applying ordinary rounding techniques. Moreover, all ranges disclosed herein are to be understood to encompass any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more and ending with a maximum value of 10 or less, e.g., 5.5 to 10. Further, as used herein, the terms "deposited over", "applied over", or "provided over" mean deposited, applied, or provided on but not necessarily in contact with the supporting surface. For example, a coating "deposited over" a substrate does not preclude the presence of one or more other coatings or films of the same or different composition located between the deposited coating and the substrate. Additionally, all percentages disclosed herein are "by weight" based on the total weight of the composition under discussion unless indicated to the contrary. Any reference "incorporated herein" is to be understood to be incorporated in its entirety. As used herein, the term "water repellant coating" means a coating providing a water contact angle of greater than 50°, such as greater than 70°, such as greater than 90°, such as greater than 100°. All water sliding angle values disclosed herein are those determined by the conventional water sliding angle test procedure described in the Examples below.

It is to be understood that the water repellant coatings and/or methods of the invention are not limited to use in any particular field but can be practiced with any desired substrate, such as but not limited to architectural windows, insulated glass units, and transparencies for air, sea-going, or land vehicles (such as automotive windshields, back lights, sidelights, moon roofs, etc.), just to name a few.

Referring to FIG. 1, there is shown a portion of an article 10 having a substrate 12 with a first major surface 14 and a second major surface 16. A water repellant coating 18 can be applied over at least a portion of the substrate 12, e.g., over at least a portion of one or more of the major surfaces 14 and/or 16. As discussed in more detail below, one or more optional primer coatings 20 and/or one or more optional functional coatings 22 can be provided over at least a portion of the substrate 12.

The substrate 12 is not limiting to the invention and can be of any desired material having any desired characteristics, such as opaque, translucent, or transparent to visible light. By "transparent" is meant having a transmittance through the substrate of greater than 0% up to 100%. By "visible light" or "visible region" is meant electromagnetic energy in the range of 395 nanometers (nm) to 800 nm. Alternatively, the substrate can be translucent or opaque. By "translucent" is meant allowing electromagnetic energy (e.g., visible light) to pass through the substrate but diffusing this energy such that objects on the side of the substrate opposite to the viewer are not clearly visible. By "opaque" is meant having a visible light transmittance of 0%. Examples of suitable substrates include, but are not limited to, plastic substrates (such as acrylic polymers, such as polyacrylates; polyalkylmethacrylates, such as polymethylmethacrylates, polyethylmethacrylates, polypropylmethacrylates, and the like; polyurethanes; polycarbonates; polyalkylterephthalates, such as polyethyleneterephthalate (PET), polypropyleneterephthalates, polybutyleneterephthalates, and the like; polysiloxane-containing polymers; or copolymers of any monomers for preparing these, or any mixtures thereof); metal substrates, such as but not limited to galvanized steel, stainless steel, and aluminum; ceramic substrates; tile substrates; glass substrates; or mixtures or combinations of any of the above. For example, the substrate can be conventional untinted soda-lime-silica glass, i.e., "clear glass", or can be tinted or otherwise colored glass, borosilicate glass, leaded glass, tempered, untempered, annealed, or heat-strengthened glass. The glass may be of any type, such as conventional float glass or flat glass, and may be of any composition having any optical properties, e.g., any value of visible radiation transmission, ultraviolet radiation transmission, infrared radiation transmission, and/or total solar energy transmission. Types of glass suitable for the practice of the invention are described, for example but not to be considered as limiting, in U.S. Pat. Nos. 4,746,347; 4,792,536; 5,240,886; 5,385,872; and 5,393,593.

Prior to application of the water repellant coating 18 over the substrate 12, the surface (or at least a portion of the surface) over which the water repellant coating 18 is to be deposited can be optionally cleaned, polished, and/or otherwise pretreated, for example to remove dirt and/or surface contaminants. Examples of such pretreatments are described, for example but not to be considered as limiting, in U.S. Pat. Nos. 5,707,740 and 5,980,990, herein incorporated by reference.

For example, at least a portion of the substrate surface can be activated by applying an acid solution to extend the durability of the subsequently applied water repellant coating 18. The acid solutions used can be selected based upon their ability to increase the durability of the water repellant coating 18 without damaging the substrate 12. Although not limiting to the invention, acid solutions that can be used include solutions of hydrochloric acid, sulfuric acid and organic acids. In one embodiment, organic acid solutions, such as strong organic acid solutions having a pH of less than about 5, such as less than about 3, can be used. Other acids that can be used include, but are not limited to, phosphoric acid, hydrobromic acid, nitric acid, acetic acid, trifluoroacetic acid, and/or citric acid.

Where the acid is hydrochloric acid, an acid solution of hydrochloric acid dissolved in deionized water in the range of 0.5–30 wt. % hydrochloric acid can be used, e.g., 0.5–20 wt. %, such as 0.5–10 wt. %. Where the acid is sulfuric acid, an acid solution of sulfuric acid dissolved in deionized water in the range of 0.5–30 wt. % sulfuric acid can be used, e.g., 0.5–20 wt. %, such as 0.5–10 wt. %. Where the acid is tartaric acid, an acid solution of tartaric acid dissolved in deionized water where the acid concentration is in the range of 1–40 wt. % tartaric acid dissolved in the balance of deionized water can be used, e.g., 2–20 wt. %. As can be appreciated, lower and higher acid concentrations can be used, however using such concentrations can require correspondingly more or less activating time on the substrate to improve the durability of the water repellent film.

The acid activation of the substrate surface can be accomplished by applying the acid solution to the substrate by any conventional technique, such as but not limited to dipping, flowing, spraying, or wiping. While no set number of wipes are required, it has been found that contacting the substrate for about 2 minutes provides acceptable results. Wiping can be done by applying moderate hand pressure to an absorbent acid-resistant pad containing the acid solution, such as a cotton pad.

Where the acid solution is volatile and will evaporate from the substrate without leaving a residue, the acid solution can be applied to the substrate and allowed to evaporate, whereupon the water repellent composition can be applied over the substrate. Volatile acid solutions are defined herein as those which are capable of volatilizing at ambient conditions within a short time period (e.g., within about 10 minutes or less) after application to the substrate. Examples of volatile acid solutions include, but are not limited to, hydrochloric, hydrobromic, acetic,-nitric, and trifluoroacetic acid solutions.

Where the acid solution is non-volatile, or is volatile but leaves behind a residue upon evaporation, the substrate can be rinsed with distilled or deionized water after the acid activation step to remove the acid solution or its residue. After rinsing, the substrate can be dried and the water repellent composition applied over the substrate. Non-volatile acid solutions are defined herein as those which are not capable of volatilizing at ambient conditions within a short time period (e.g., within about 10 minutes or less) after application to the substrate. Examples of non-volatile acids include, but are not limited to, sulfuric, tartaric, citric, and phosphoric acids. The rinsing solution can include water, such as distilled or deionized water, or alcohol mixed with water.

Alternatively or additionally, prior to deposition of the water repellant coating 18, the surface (or at least a portion thereof) over which the coating 18 is to be applied can be optionally simultaneously abrasively and chemically prepared as described, for example but not to be considered as limiting, in U.S. Pat. No. 6,025,025, herein incorporated by reference. For example, prior to applying the water repellent coating 18, a dispersion including at least one abrading compound and at least one acid in solution can be applied over at least a portion of the substrate 12, e.g., that portion of the substrate 12 where the water repellant coating 18 is to be deposited.

Factors affecting the choice of acids for inclusion in the acid solution include, but are not limited to, the substrate being treated, the acid or acid combination selected, the abrading compound dispersed in the acid solution, and the strength and type of chemical bonding between the materials being removed and the substrate. For example, the acid solution can be selected to remove materials from the substrate surface without completely dissolving the abrading compound dispersed therein and without damaging the surface of the substrate being treated. The acid can be selected such that the species removed from the substrate surface, such as but not limited to Na, Ca, Sn, Fe, and Al ions, remain soluble in the acid solution to prevent their precipitation from the acid solution and redeposition on the substrate surface.

Acids suitable for use with many substrates include, but are not limited to, hydrochloric acid, sulfuric acid, phosphoric acid, hydrobromic acid, nitric acid, and organic acids or mixtures thereof. Where organic acids are selected, strong organic acid solutions can be used, which include acid solutions having a pH of less than about 5, such as less than about 3 (e.g., tartaric acid, acetic acid, oxalic acid, trifluoroacetic acid, and citric acid).

Acid concentrations in the acid solution depend largely upon the acid or acids selected, the acid solution solvent, and the interaction between the acid solution and the substrate. However, for many applications, acid concentrations can be generally in the range of about 1 to 5 weight percent. Where the acid is hydrochloric acid ("HCl"), an acid solution of hydrochloric acid dissolved in water in the range of 0.1 to 30 wt. % hydrochloric acid, such as 0.1 to 20 wt. %, such as 0.5 to 10 wt. %, such as 1 to 5 wt. %, can be used. The foregoing ranges and discussion are also applicable for sulfuric acid. Where the acid is tartaric acid, an acid concentration of tartaric acid in the range of 1 to 40 wt. %, such as 2 to 20 wt. %, can be used. As can be appreciated, lower and higher acid concentrations can be used; however, using such concentrations can require correspondingly more or less activating time on the substrate to improve the durability of the water repellent film.

Factors affecting the selection of suitable abrading compounds include, but are not limited to, the substrate being treated, the ability of the abrading compound to withstand the acidic environment of the acid solution, the grit size or other abrasive measure of the abrading compound, the method of treating the surface of the substrate with the abrading compound, the strength and type of bonding between the materials being removed, and substrate, and the acquisition costs, ease of use, safety and disposal costs associated with a particular abrading compound. Where the surface of the substrate is treated by wiping the abrading compound/acid solution dispersion over the surface of the substrate, the amount of force directed toward the substrate and the number of passes to be applied over the surface of the substrate can be considered when selecting an abrading compound. The abrading compound can be present in sufficient concentration and have sufficient abrasiveness to loosen and dislodge the materials blocking the bonding sites for the number of passes applied with the applied pressure, while being able to withstand the acidic environment of the acid solution and not materially affect the mechanical or optical properties of the surface, as for example, by scratching the surface to render the substrate unacceptable for its intended use. For many applications, removal of about 2 Å to about 10 Å of the substrate's surface can expose a sufficient number of bonding sites to measurably improve the durability of the water repellent film. Abrading compounds suitable for use with many acid solutions include, but are not limited to, alumina, ceria, iron oxide, garnet, zirconia, silica, silicon carbide, chromic oxides pumice, and diamond-based abrading compounds, and combinations thereof.

In one embodiment, the abrading compound can have a grit size in the range of about 0.1 to 20 microns, such as 0.5 to 5 microns, e.g., 1 to 3 microns. The abrading compound can be in dry particulate form or can be present as a dispersion in a liquid carrier. Although not limiting in the present invention, one type of abrasive material that can be used is Microgrit® WCA lapping powder which is an aluminum oxide abrasive available from Micro Abrasives Corporation, Westfield, Mass. In one embodiment, the abrading compound can be added in the range of about 5 to 30 wt. % to an acid solution to form the abrading compound/acid solution dispersion as discussed earlier. By way of a non-limiting example, where the substrate is a glass substrate, suitable abrading compounds include, but are not limited to, alumina or ceria having an average size of about 1 to 3 microns, which are present in a total concentration of about 15 to 20 wt. % in a 1 to 5 wt. % hydrochloric acid/deionized water solution.

The activation of the substrate can be accomplished by applying and wiping the abrading compound/acid solution dispersion on the substrate surface by any conventional technique known in the art. For example, the dispersion can be applied directly on the substrate surface and wiped by hand, applying moderate hand pressure to an absorbent, acid-resistant pad. The dispersion can also be applied directly to the pad and subsequently wiped on the substrate surface. Alternatively, powered equipment, such as an orbital sander with a non-abrasive pad, can be used to apply the abrading compound/acid solution dispersion. The substrate surface can be wiped at least until the abrading compound/acid solution dispersion "wets" the surface of the substrate, i.e., until it no longer "pulls away" from any part of the substrate surface. In one embodiment, the abrading compound/acid solution dispersion can be applied for a dwell time, i.e., the amount of time the abrading compound/acid solution dispersion remains on the substrate before being removed, in the range of about 1 to 5 minutes, such as about 1 to 2 minutes.

Whether or not one of the above-described optional pretreatment steps is performed, the water repellant coating 18 can be applied over all or at least a portion of the substrate 12, e.g., over all or a portion of the surface 14 and/or the surface 16. The water repellant coating 18 can be formed by the application of at least one water repellant coating composition of the invention over at least a portion of the substrate. As described in more detail below, the at least one coating composition can comprise: (1) a perfluoroalkylalkylsilane; (2) an integral primer, such as a silane or siloxane; and (3) a substantially non-halogenated, e.g., substantially non-fluorinated, alkylsilane. By "substantially non-halogenated" and "substantially non-fluorinated" is meant that any halogen or fluorine atoms, if present at all, are not present in sufficient amount to raise the sliding angle of the coating to be more than 22°, such as not more than 20°, such as not more than 15°, and preferably not more than 10°. In one particular non-limiting embodiment described hereinafter, the coating 18 can be deposited using a two-part application process in which a first coating composition comprising one or more of the above constituents is applied over the substrate 12 and then a second coating composition comprising one or more of the remaining constituents is applied over the substrate 12 to form the coating 18.

In one embodiment, the first coating composition can comprise at least one perfluoroalkylalkylsilane and at least one integral primer, such as but not limited to a hydrolyzable, e.g., completely hydrolyzable, silane or siloxane. Non-limiting examples of acceptable perfluoroalkylalkylsilanes and primers are disclosed in, but are not limited to, U.S. Pat. Nos. 5,328,768 and 5,523,162, herein incorporated by reference. These disclosed perfluoroalkylalkylsilanes have the general formula $R_m R'_n SiX_{4-m-n}$, wherein $R_m$ is a perfluoroalkylalkyl moiety; m is 1, 2 or 3; n is 0, 1 or 2; and m+n is less than 4; R' is a vinyl or an alkyl radical, such as methyl, ethyl, vinyl or propyl; and X is a hydrolyzable radical such as halogen, acyloxy, and/or alkoxy.

Another way of expressing acceptable perfluoroalkylalkylsilanes is using the general formula $(R^1 R^2)_m SiR^3_n X_{4-m-n}$, where $R^1$ is a perfluoroalkyl moiety having the general formula $C_q F_{2q+1}$; $R^2$ is a bisubstituted organic radical preferably having the general formula $(C_s H_{2s})$; $R^3$ is an alkyl moiety, such as methyl, ethyl, propyl, butyl, and the like, having the general formula $C_n H_{2n+1}$, or an alkenyl moiety having the general formula $C_n H_{2n-1}$, such as a vinyl moiety, and X can be one or more hydrolyzable moieties, such as one or more halogen, acyloxy, and/or alkoxy moieties. By "bisubstituted organic radical" is meant an organic moiety substituted in two places, i.e., with other components attached in two places. It is to be understood that the "X" substituents for a particular perfluoroalkylalkylsilane need not all be the same moiety. For example, one substituent could be a halogen, one substituent could be an acyloxy moiety, and one substituent could be an alkoxy moiety. In one embodiment, m can be 1, 2, or 3; n can be 0, 1, or 2; and m+n is less than 4.

Examples of acceptable perfluoroalkyl moieties ($R^1$) include those having q in the range of 1 to 30, such as 6 to 18, such as 8 to 12, e.g., $CF_3$ to $C_3 OF_{61}$, $C_6 F_{13}$ to $C_{18} F_{37}$, $C_8 F_{17}$ to $C_{12} F_{25}$. The perfluoroalkyl component of the perfluoroalkylalkylsilane can be a branched chain or a straight, i.e., normal, chain. Examples of acceptable bisubstituted organic moieties ($R^2$) include those having branched or normal carbon chains with s in the range of 2 to 10, such as 2 to 5, such as 2 to 3. In one non-limiting embodiment, $R^2$ can be a substituted alkyl such as ethyl, propyl, butyl, and pentyl. Examples, of constituents for X include hydrolyzable chloro, bromo, iodo, methoxy, ethoxy, and acetoxy groups. Examples of suitable perfluoroalkylalkylsilanes for the practice of the invention include, but are not limited to, perfluoroalkylethyltrichlorosilane, perfluoroalkylethyltrimethoxysilane, perfluoroalkylethyltriacetoxysilane, perfluoroalkylethyldichloro(methyl)silane, perfluorooctylethyltrichlorosilane and perfluoroalkylethyldiethoxy (methyl)silane. In one embodiment, the perfluoroalkylalkylsilane component can be present in the first composition in the range of greater than 0 wt. % to 15 wt. %, such as 0.25 wt. % to 3 wt. %, based on the total weight of the first composition. In one particular embodiment, the perfluoroalkylalkylsilane component can be present in the first composition in an amount of 0.5 to 1 wt. % based on the total weight of the first composition.

By way of examples, an exemplary perfluoroalkylalkylsilane in which $R^1$ is $C_8 F_{17}$, $R^2$ is $C_2 H_4$, $R^3$ is $CH_3$, and X is Cl, with m=1 and n=1 can be described by the general formula:

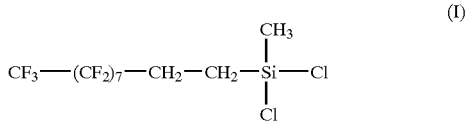

(I)

Another exemplary perfluoroalkylalkylsilane in which $R^1$ is $C_9F_{17}$, $R^2$ is $C_2H_4$, $R^3$ is an alkenyl moiety $C_2H_3$, and X is Cl with m=2 and n=1 can be described by the general formula:

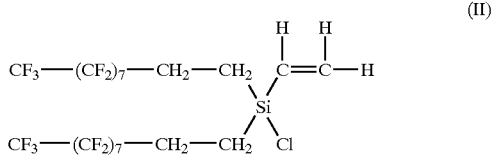

(II)

As will be appreciated by one skilled in the art, the perfluoroalkylalkylsilane structures of formulas I and II are simply presented as examples of suitable structures and the invention is not limited to these specifically disclosed structures.

As will be appreciated by one skilled in the art, the perfluoroalkylalkylsilane can have a first chain length (e.g., effective chain length). By "effective chain length" for the perfluoroalkylalkylsilane is meant the combined length of the $R^1$ and $R^2$ constituents. For normal, i.e., non-branched, chains this first effective chain length can be defined as (q+s) carbon atoms in length. For example, for formula I above, the first effective chain length is 10 carbon units in length. For branched chains, this first chain length can be defined as the distance from the proximate end of the $R^2$ constituent (i.e., the carbon attached to the Si) to the distal end of the $R^1$ constituent (i.e., the —$CF_3$ moiety spaced farthest from the Si).

Examples of integral primers suitable for the invention are disclosed, for example, in U.S. Pat. Nos. 5,707,740 and 5,523,161, herein incorporated by reference. The integral primer, although not limiting in the invention, can be a hydrolyzable silane or siloxane capable of hydrolytic condensation to form silica gel. Suitable silanes capable of hydrolysis to silica gel can have the general formula $SiZ_4$ wherein Z can be a hydrolyzable group, such as one or more halogen, alkoxy, and/or acyloxy groups. Examples of suitable Z moieties include but are not limited to chloro, bromo, iodo, methoxy, ethoxy, and acetoxy groups. Examples of suitable hydrolyzable silanes include, but are not limited to, tetrachlorosilane, tetramethoxysilane, and tetraacetoxysilane.

Suitable siloxanes can have the general formula $Si_yO_zX_{4y-2z}$, wherein X can be one or more halogen, alkoxy, and/or acyloxy groups, y can be two or more, z can be one or more, and 4y−2z is greater than zero. Suitable hydrolyzable siloxanes include, but are not limited to, hexachlorodisiloxane, octachlorotrisiloxane, and higher oligomer chlorosiloxanes.

In one embodiment, the primer component can be present in the at least one coating composition, e.g., the first composition, in the range of greater than 0 wt. % to 5 wt. %, such as 0.05 wt. % to 2 wt. %, based on the total weight of the first composition. In one particular embodiment, the primer component can be present in the first composition in an amount of 1.25 wt. % based on the total weight of the first composition. The amount can be greater than 1.25 wt. % which may slightly reduce the sliding contact angle but which can increase the durability of the coating as measured by flannel abrasion testing. This test is well known to those skilled in the art.

The first composition can include a first solvent, such as an aprotic solvent, e.g., an alkane or mixture of alkanes, or a fluorinated solvent. The first composition can be applied to the substrate by any conventional technique known in the art, such as but not limited to dipping, flowing, or wiping. In one embodiment, the first solvent can be free of or substantially free of ether and/or hydroxyl groups. By "substantially free of ether and/or hydroxyl radicals" is meant that, if present, such groups are present at a sufficiently low level so as not to adversely interfere with the silane. For example, if present, the number of moles of hydroxyl functional groups do not exceed the number of moles of any silane.

The second coating composition can comprise at least one non-halogenated or substantially non-halogenated, e.g., non-fluorinated, alkylsilane. Exemplary alkylsilanes can be represented by the general formula $R^4_tSiR^5_uY_{4-t-u}$, where $R^4$ can be an alkyl group having the general formula $C_pH_{2p+1}$, $R^5$ can be an alkyl moiety, such as methyl, ethyl, propyl, butyl, and the like, having the general formula $C_nH_{2n+1}$ or a alkenyl moiety having the general formula $C_nH_{2n-1}$, such as a vinyl moiety. In one aspect, t can be 1, 2, or 3; u can be 0, 1, or 2; and t+u is less than 4, and Y can be a hydrolyzable moiety, such as those described above for "X" of the perfluoroalkylalkylsilane. In one embodiment, p can be in the range of 1 to 30, such as 5 to 20, such as 10 to 20, such as 15 to 20. $R^4$ can be a branched alkyl group or a straight, i.e., normal, group having a second effective chain length. As will be appreciated by one skilled in the art, the "effective chain length" of the non-fluorinated alkylsilane can be defined as the distance from the proximate end of the alkyl chain (e.g., the carbon attached to the Si) to the distal end of the chain (e.g., the carbon atom spaced farthest from the proximate end). For normal alkyl chains having the general formula $C_pF_{2p+1}$, the chain length can be defined as p carbon atoms in length. Examples of suitable non-fluorinated alkylsilanes include n-decyltrichlorosilane, n-dodecyltrichlorosilane, and n-octadecyltrichlorosilane, just to name a few. In one embodiment, the non-fluorinated alkylsilane component can be present in the second composition in an amount in the range of greater than 0 wt. % to 20 wt. %, such as 0.1 wt. % to 20 wt. %, e.g. 0.1 to 10 wt. %, such as 0.5 wt. % to 3 wt. %, such as 1 wt. % to 2 wt. %, based on the total weight of the first composition. In one particular embodiment, the non-fluorinated alkylsilane component can be present in the second composition in an amount of 1.75 wt. % based on the total weight of the first composition.

The second composition can include a second solvent, such as an aprotic solvent, e.g., an alkane or mixture of alkanes. The second composition can be applied to the substrate by any conventional technique known in the art, such as but not limited to dipping, flowing, or wiping. The second solvent can be free of or substantially free of ether and/or hydroxyl radicals as described above. Although not limiting to the invention, the second solvent can be the same as the first solvent.

In one practice of the invention, the perfluoroalkylalkylsilane and non-fluorinated alkylsilane can be selected such that the effective chain length of the non-fluorinated alkylsilane component is greater than or equal to the effective chain length of the perfluoroalkylalkylsilane component. Using the above general formulas, this means that for normal alkyl chains, p is greater than or equal to the sum of (q+s). For branched chains, this means that the distance from the Si atom to the carbon atom of the alkyl chain located the greatest distance from the Si atom is greater for the non-fluorinated alkylsilane than for the perfluoroalkylalkylsilane. It is believed that having the non-fluorinated alkylsilane effective chain length longer than the effective chain length of the perfluoroalkylalkylsilane moiety allows the outer portion of the alkyl chain of the non-fluorinated alkylsilane to fold over or mask at least a portion of the perfluoroalkylalkylsilane chain and helps reduce the sliding angle of the coating 18. The presence of the perfluoroalkylalkylsilane improves the weathering durability of the coating 18.

After application, the perfluoroalkylalkylsilane, integral primer, and non-fluorinated alkylsilane react to form the coating 18. Although not required to form the coating 18, the applied coating composition can be cured by heating the coated substrate to a temperature above 150° F. (65° C.) for a period of 30 minutes or more, such as 1 hour or more. As will be appreciated, as the curing temperature increases, the curing time can decrease. For example, the coated substrate can be heated to a temperature of 450° F. (232° C.) for 1 minute or more.

The first or second coating composition can also optionally include a fluorinated olefin telomer, such as but not limited to those disclosed in U.S. Pat. Nos. 4,983,459; 4,997,684; 5,328,768; and 5,523,162, herein incorporated by reference, to provide lubricity to promote dirt repellency of the water repellent surface. In one embodiment, the olefin telomer can be selected from the group represented by the general formula $C_mF_{2m+1}CH=CH_2$, where m is from 1 to 30, such as 1 to 16, e.g., 4 to 10.

Although in the above exemplary composition the integral primer was present in the first coating composition, it is to be understood that the primer can be located in the first composition, or the second composition, or both compositions.

Additionally, the coating 18 need not be applied using the two-step process described above. For example, the coating 18 can be deposited from a single coating composition comprising at least one perfluoroalkylalkylsilane, at least one integral primer, and at least one substantially non-halogenated alkylsilane, such as those described above, dissolved in a solvent (such as: the first or second solvents described above).

The water repellant coating of the invention can provide a coated surface with a water sliding angle of less than 22°, such as less than 20°, such as less than 15°, such as less than 13°, such as in the range of greater than 0° to 15°.

In one alternative embodiment, a discrete primer layer 20, such as a silica layer, can be provided over at least a portion of the substrate 12 and the water repellant coating 18 of the invention can be deposited over the primer layer 20. Examples of suitable primer layers and primer deposition methods are disclosed, for example but not limited to, in U.S. Pat. Nos. 5,328,768; 5,523,162; and 5,707,740, herein incorporated by reference.

As shown in FIG. 1, one or more optional functional coatings 22 can also be deposited over the substrate 12, such as over all or a portion of one or more of the surfaces 14, 16. The functional coating 22 can be provided between the water repellant coating 18 and the substrate 12 or, as shown in FIG. 1, on a different surface than the water repellant coating 18. The functional coating 22 can be of any desired type. As used herein, the term "coating" includes one or more coating layers and/or coating films. The functional coating 22 can have one or more functional coating layers or films of the same or different composition or functionality. As used herein, the terms "layer" or "film" refer to a coating region of a desired or selected coating composition. Although not limiting to the invention, the functional coating 22 can be a coating which affects the solar control properties, e.g., emissivity, shading coefficient, transmission, absorption, reflection, etc., or conductive properties, e.g., thermal or electrical conduction, or physical properties, e.g., hydrophilicity, of the functionally coated substrate. For example, but not to be considered as limiting, the functional coating 22 can be an electroconductive coating, a heatable coating, an antenna coating, a hydrophilic coating, a photoactive coating (such as a photohydrophilic and/or photocatalytic coating), or a solar control coating, such as a low emissivity coating. As used herein, the term "solar control coating" refers to a coating which affects the solar properties of the coated article, such as but not limited to shading coefficient and/or emissivity and/or the amount of solar radiation reflected and/or absorbed by and/or transmitted through the coated article, e.g., infrared or ultraviolet absorption or reflection. The solar control coating can block, absorb, or filter selected portions of the solar spectrum, such as but not limited to the visible spectrum. Non-limiting examples of solar control and antenna coatings are disclosed in U.S. Pat. Nos. 4,898,789; 5,821,001; 4,716,086; 4,610,771; 4,902,580; 4,716,086; 4,806,220; 4,898,790; 4,834,857; 4,948,677; 5,059,295; and 5,028,579, which patents are herein incorporated by reference. Non-limiting examples of electroconductive coatings are disclosed in U.S. Pat. Nos. 5,653,903 and 5,028,759, which are herein incorporated by reference.

In one exemplary embodiment, the functional coating 22 can be a low emissivity coating. As will be appreciated by one skilled in the art, a "low emissivity" coating can have different emissivity values depending upon how the coating is deposited. For example, low emissivity sputter applied coatings typically have an emissivity in the range of 0.01 to 0.06, depending on the number of reflective metal layers present in the coating. Low emissivity pyrolytically applied coatings typically have an emissivity in the range of less than 0.03. Therefore, as generally used herein, the term "low emissivity" means an emissivity less than 0.1, such as less than 0.05. Examples of low emissivity coatings are found, for example, in U.S. Pat. Nos. 4,952,423 and 4,504,109. The functional coating 22 can be a single layer or multiple layer coating and can comprise one or more metals, non-metals, semi-metals, semiconductors and/or alloys, compounds, composites, combinations, or blends thereof. For example, the functional coating 22 can be a single layer metal oxide coating, a multiple layer metal oxide coating, a non-metal oxide coating, or a multiple layer coating.

Non-limiting examples of functional coatings 22 which can be used with the invention are commercially available from PPG Industries, Inc. of Pittsburgh, Pa. under the SUNGATE® and SOLARBAN® families of coatings. Such functional coatings typically include one or more anti-reflective coating films comprising dielectric or anti-reflective materials, such as metal oxides or oxides of metal alloys, which are transparent or substantially transparent to visible light. The functional coating 22 can also include infrared reflective films having a reflective metal, e.g., a noble metal, such as gold, copper, or silver, or combinations or alloys thereof, and can further include a primer film or barrier film, such as titanium, as is known in the art, located over and/or under the metal reflective layers.

Alternatively, the functional coating 22 can be a hydrophilic or photoactive (e.g., photohydrophilic and/or photocatalytic) coating. Non-limiting examples of photoactive coatings are described in U.S. Pat. Nos. 5,873,203; 5,854,169; 6,027,766; 6,054,227; 6,603,363; 6,077,492; and 6,013,372, herein incorporated by reference.

Figure 2:
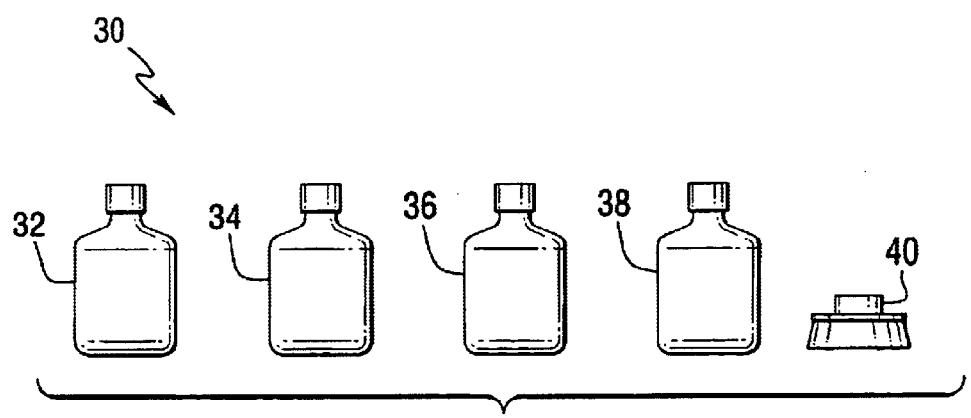
FIG. 2 is a front view of a coating system in the form of a kit for applying a water repellant coating of the invention over a substrate.

FIG. 2 shows a coating system of the invention in the form of a kit 30. The kit 30 contains at least one coating composition of the invention as described above. In the illustrated embodiment, the kit 30 includes a first container 32 comprising a first coating composition as described above and a second container 34 containing a second coating composition as described above. The kit 30 can also include one or more applicators 40 to apply the coating composition(s), optionally a container 36 having an acid solution as described above to pre-treat or activate the substrate surface prior to application of the coating composition, and/or optionally a container 38 having an acid/abrading compound dispersion as described above. The various components of the kit can be provided in a carrying case, a bag, or similar device.

The general concepts of the invention will be further described with reference to the following Examples. However, it is to be understood that the following Examples are merely illustrative of the general concepts of the invention and are not intended to be limiting.

EXAMPLES

The following Examples 1–3 demonstrate the application of a long chain, non-fluorinated alkylsilane solution after a first non-fluorinated treatment to result in a lower sliding angle of water over the second treatment than would occur if the second treatment were omitted. Example 4 illustrates the use of a long chain, non-fluorinated alkylsilane to reduce the sliding angle over what would be observed without that silane in a single treatment step.

As will be appreciated by one skilled in the art, sliding angles are indicative of the ease at which a drop of water will roll off the glass. For the following Examples, the sliding angle determination included washing the sample surface with ethanol and a nylon cleanroom wiper three times to ensure the surface was clean, placing the sample on an inclinable plate equipped with a digital level capable of 0.1° resolution, and in Examples 1–3 the use of a Zerostat anti-static instrument, commercially available from Discwasher, Inc. to reduce static charging on the sample and the syringe needle. The inclinable plate was tilted to a starting incline of 5–9° (planned to be 5–10° below the expected result). Five droplets of water from a calibrated pipette were placed on the surface; each droplet had an estimated volume of about 48.7 microliters. The drops were placed with the trailing edge of the drop against the uphill edge of a 1 mm black line on paper placed under the glass sample. The plate was inclined at a rate of 4°/minute until the trailing edge of the drops moved 1 mm down the plate as determined by the trailing edge hitting the down slope edge of the 1 mm line. The angle at which each drop completed the 1 mm travel was recorded as the sliding angle and the 5 readings were averaged.

Example 1

The tin side surfaces of 2.3 mm thick clear float glass samples commercially available from PPG Industries, Inc. were cleaned with 50 volume % mixture of 2-propanol and deionized water using a paper towel. The surfaces were then mechanically polished using an orbital sander with an acidified aluminum oxide polishing medium. The polishing residues were removed by washing the surface with 5 wt. % hydrochloric acid and the glass surfaces were then contacted with 5 wt. % HCl for 2 minutes. After the 2 minutes, the surfaces were washed with deionized water. Two glass samples (Samples A and B) were treated by wiping the surfaces with a cellulosic pad containing 2 mL of a mixture of 1.75 wt. % silicon tetrachloride and 0.75 wt. % $C_8F_{17}CH_2CH_2SiCl_3$ in a solvent of isoparaffinic alkanes (ISOPAR L solvent commercially available from Exxon Corporation). Sample B was further treated by wiping with a cellulosic pad containing 3 mL of a mixture of 1.75 wt. % $CH_3(CH_2)_{17}SiCl_3$ in the same solvent. After each treatment with a chlorosilane solution, the surfaces were wiped dry with a paper towel. Sample A exhibited a sliding angle of 13.5° and sample B exhibited a reduced sliding angle of 10.9°.

Example 2

Two samples (Samples C and D) were prepared similarly to those in Example 1 except the chlorosilane solutions were varied. Samples C and D were both treated by wiping with a cellulosic pad containing 2 mL of a mixture of 0.75 wt. % silicon tetrachloride and 0.75 wt. % $C_8F_{17}CH_2CH_2SiCl_3$ in the same solvent as Example 1. Sample D was further treated by wiping with a cellulosic pad containing 3 mL of a mixture of 1.25 wt. % $CH_3(CH_2)_{17}SiCl_3$ in the same solvent. After each treatment with a chlorosilane solution, the surfaces were wiped dry with a paper towel. Sample C exhibited a sliding angle of 17.4° and sample D exhibited a reduced sliding angle of 15.0°.

Example 3

Two samples (Samples E and F) were prepared similarly to those in Example 1 except the chlorosilane solutions were varied. Samples E and F were treated by wiping with a cellulosic pad containing 2 mL of a mixture of 1.25 wt. % silicon tetrachloride and 0.75 wt. % $C_8F_{17}CH_2CH_2SiCl_3$ in the isoparaffinic alkane solvent. Sample F was further treated by wiping with a cellulosic pad containing 3 mL of a mixture of 1.75 wt. % $CH_3(CH_2)_{17}SiCl_3$ in the same solvent. After each treatment with a chlorosilane solution, the surfaces were wiped dry with a paper towel. Sample E exhibited a sliding angle of 15.9° and sample F exhibited a reduced sliding angle of 12.5°.

Example 4

The tin side surfaces of two 4 mm thick clear float glass samples (Samples G and H) were cleaned with a 50 volume % solution of 2-propanol and deionized water. The surfaces were then mechanically polished using an orbital sander having an acidified aluminum oxide polishing medium on a felt pad. The polishing residues were allowed to sit on the surface for 2 minutes and were then removed by washing the surface with deionized water. Sample G was treated by wiping with a cellulosic pad containing 4 mL of a mixture of 0.8 wt. % silicon tetrachloride and 0.8 wt. % $C_8F_{17}CH_2CH_2SiCl_3$ in the isoparaffinic solvent described above. Sample H was treated by wiping with a cellulosic pad containing 4 mL of a mixture of 0.5 wt. % $C_8F_{17}CH_2CH_2SiCl_3$ and 0.5 wt. % $CH_3(CH_2)_{17}SiCl_3$ in the same solvent. After each treatment with a chlorosilane solution, the surfaces were wiped dry with a paper towel. Two glass coupons of sample G averaged a sliding angle of 17.5° and two coupons of sample H averaged a reduced sliding angle of 14.2°.

It will be readily appreciated by those skilled in the art that modifications may be made to the invention without departing from the concepts disclosed in the foregoing description. Accordingly, the particular embodiments described in detail herein are illustrative only and are not limiting to the scope of the invention, which is to be given the full breadth of the appended claims and any and all equivalents thereof.

What is claimed is:

1. A method of applying a water repellant coating over a substrate surface, comprising:
   contacting a surface with a first coating composition comprising at least one perfluoroalkylalkylsilane; and
   contacting the surface with a second composition comprising at least one substantially non-halogenated alkylsilane.

2. The method of claim 1, wherein at least one of the first and second coating compositions comprises at least one hydrolyzable primer.

3. The method of claim 1, wherein the perfluoroalkylalkylsilane is selected from compounds having the general formula $(R^1R^2)_m SiR^3_n X_{4-m-n}$, wherein $R^1$ is a perfluoroalkyl moiety having the general formula $C_q F_{2q+1}$, $R^2$ is a bisubstituted organic radical having the general formula —$(C_s H_{2s})$— $R^3$ is an alkyl, vinyl, or alkenyl moiety, X is a hydrolyzable group, wherein m is 1, 2, or 3, n is 0, 1, or 2, m+n is less than 4, and m, n, q, and s are whole numbers.

4. The method of claim 3, wherein q is in the range of 1 to 30.

5. The method of claim 4, wherein q is in the range of 6 to 18.

6. The method of claim 5, wherein q is in the range of 8 to 12.

7. The method of claim 3, wherein s is in the range of 2 to 10.

8. The method of claim 3, wherein s is in the range of 2 to 5.

9. The method of claim 3, wherein s is in the range of 2 to 3.

10. The method of claim 2, wherein X is selected from the group consisting of chloro, bromo, iodo, methoxy, ethoxy, and acetoxy groups.

11. The method of claim 1, wherein the perfluoroalkylalkylsilane is selected from the group consisting of perfluoroalkylethyltrichlorosilane, perfluoroalkylethyltrimethoxysilane, perfluoroalkylethyltriacetoxysilane, perfluoroalkylethyldichloro(methyl)silane and perfluoroalkylethyldiethoxy(methyl)silane.

12. The method of claim 2, wherein the hydrolyzable primer comprises a silane having the general formula $SiZ_4$, wherein Z is selected from halogen, alkoxy, and acyloxy groups.

13. The method of claim 1, wherein the first composition comprises the perfluoroalkylalkylsilane in a range of greater than 0 wt. % to 15 wt. %.

14. The method of claim 1, wherein the first composition comprises the perfluoroalkylalkylsilane in a range of greater than 0.25 wt. % to 2 wt. %.

15. The method of claim 2, wherein the first composition comprises the hydrolyzable primer in a range of greater than 0 wt. % to 5 wt. %.

16. The method of claim 2, wherein the first composition comprises the hydrolyzable primer in a range of 0.05 wt. % to 2 wt. %.

17. The method of claim 1, wherein the first composition comprises a first solvent that is substantially free of at least one of ether groups and hydroxyl groups.

18. The method of claim 14, wherein the first solvent comprises a mixture of alkanes.

19. The method of claim 1, wherein the non-halogenated alkylsilane is a non-fluorinated alkylsilane.

20. The method of claim 1, wherein the non-halogenated alkylsilane has the general formula $R^4_t SiR^5_u Y_{4-t-u}$, where $R^4$ is an alkyl group, $R^5$ is an alkyl, vinyl, or alkenyl group, Y is a hydrolyzable group, wherein t is 1, 2, or 3, u is 0, 1, or 2, and t+u is less than 4.

21. The method of claim 20, wherein $R^4$ is an alkyl group having the general formula $C_p H_{2p+1}$, with p in the range of 1 to 30.

22. The method of claim 21, wherein p is in the range of 5 to 20.

23. The method of claim 21, wherein p is 18 and Y is Cl.

24. The method of claim 21, wherein $R^4$ is a normal alkyl group.

25. The method of claim 1, wherein the second composition comprises the non-halogenated alkylsilane in a range of 0.1 wt. % to 20 wt. %.

26. The method of claim 1, wherein the second composition comprises the non-halogenated alkylsilane in a range of 0.5 wt % to 3 wt. %.

27. The method of claim 1, wherein the second composition comprises the non-halogenated alkylsilane in a range of 1 wt. % to 2 wt. %.

28. The method of claim 1, wherein the second composition comprises a second solvent that is substantially free of at least one of ether groups and hydroxyl groups.

29. The method of claim 1, including applying the first and second compositions such that the resultant water repellant coating has a thickness in the range of greater than 0 Å to 100 Å.

30. The method of claim 29, wherein the water repellent coating has a thickness in the range of 20 Å to 100 Å.

31. The method of claim 29, wherein the water repellent coating has a thickness of less than or equal to 50 Å.

32. The method of claim 1, including applying the first and second compositions such that the resultant water repellent coating provides a water sliding angle of less than or equal to 22°.

33. The method of claim 1, including applying the first and second compositions such that the resultant water repellent coating provides a water sliding angle of less than 20°.

34. The method of claim 1, including applying the first and second compositions such that the resultant water repellent coating provides a water sliding angle of less than 15°.

35. The method of claim 1, wherein the perfluoroalkylalkylsilane has a first effective chain length, the non-halogenated alkylsilane has a second effective chain length, and wherein the second effective chain length is greater than or equal to the first effective chain length.

36. The method of claim 1, including contacting the surface with an acid solution.

37. The method of claim 36, wherein the acid solution is selected from hydrochloric acid, sulfuric acid, nitric acid, and tartaric acid.

38. The method of claim 1, including simultaneously abrasively and chemically preparing the surface by applying a dispersion comprising an acid solution and an abrasive material to said surface.

39. The method of claim 38, wherein the abrading material is selected from the group consisting of alumina, ceria, iron oxide, garnet, zirconia, silica, silicon carbide, chromic oxide, pumice, and diamond.

40. A method of applying a water repellant coating over at least a portion of a substrate surface comprising:

contacting the substrate surface with at least one coating composition comprising at least one perfluoroalkylalkylsilane having a first effective chain length, at least one hydrolyzable silane, and at least one substantially non-halogenated alkylsilane having a second effective chain length that is greater than or equal to the first effective chain length.

41. A coated article made according to the method of claim 1.

42. A coated article, comprising:
   a substrate having at least one surface; and
   a coating applied over at least a portion of the surface, the coating comprising the reaction product of:
   a perfluoroalkylalkylsilane having the general formula $(R^1R^2)_m SiR^3_n X_{4-m-n}$, where $R^1$ is a perfluoroalkyl group, $R^2$ is a bisubstituted organic radical, $R^3$ is an alkyl, vinyl, or alkenyl group, and X is at least one hydrolyzable group;
   a hydrolyzable silane having the general formula $SiZ_4$, where Z is a hydrolyzable group; and
   a substantially non-fluorinated alkylsilane having the general formula $R^4_t SiR^5_u Y_{4-t-u}$, where $R^4$ is an alkyl group, $R^5$ is an alkyl, vinyl, or alkenyl group, Y is at least one hydrolyzable group, wherein t is 1, 2, or 3, u is 0, 1, or 2, t+u is less than 4, and m, n, t, and u are whole numbers.

43. The coated article of claim 42, wherein an effective chain length of the non-fluorinated alkylsilane is greater than or equal to an effective chain length of the perfluoroalkylalkylsilane.

44. The coated article of claim 42, wherein the coated article has a water sliding angle of less than or equal to 22°.

45. The coated article of claim 42, wherein the coated article has a water sliding angle of less than or equal to 20°.

46. The coated article of claim 42, the coated article has a water sliding angle of less than or equal to 15°.

47. A coated article, comprising:
   a substrate having at least one surface; and
   a coating applied over at least a portion of the surface, the coating comprising:
   a perfluoroalkylalkylsilane having a first effective chain length; and
   a substantially non-fluorinated alkylsilane having a second effective chain length, wherein the second effective chain length is longer than the first effective chain length.

48. A coating kit for applying a water repellant coating over a substrate, comprising:
   a first composition comprising at least one perfluoroalkylalkylsilane; and
   a second composition comprising a non-fluorinated alkylsilane, wherein at least one of the first and second compositions further comprises at least one hydrolyzable silane.

49. The coating kit of claim 48, wherein the perfluoroalkylalkylsilane has a first effective chain length, the non-fluorinated alkylsilane has a second effective chain length, and the second effective chain length is longer than the first effective chain length.

50. A coating kit, comprising:
   at least one coating composition comprising at least one perfluoroalkylalkylsilane, at least one hydrolyzable primer, and at least one substantially non-fluorinated alkysilane.

51. The coating kit of claim 50, wherein the primer comprises at least one of a silane and a siloxane.

* * * * *

UNITED STATES PATENT AND TRADEMARK OFFICE
CERTIFICATE OF CORRECTION

PATENT NO. : 6,811,884 B2  
APPLICATION NO. : 10/328804  
DATED : November 2, 2004  
INVENTOR(S) : George B. Goodwin and Chia-Cheng Lin Page 1 of 1

It is certified that error appears in the above-identified patent and that said Letters Patent is hereby corrected as shown below:

Column 15, line 24, delete "-$(C_sH_{2s})$- $R^3$" and insert -- -$(CH_2)_s$-, $R^3$ --.

Column 15, lines 29 and 30, delete "6 to 18" and insert -- 4 to 18 --.

Column 15, lines 31 and 32, delete "8 to 12" and insert -- 6 to 12 --.

Column 15, line 39, delete "claim 2" and insert -- claim 3 --.

Column 16, line 23, delete "0.5 wt % to 3 wt. %" and insert -- 0.3 wt. % to 5 wt. % --.

Column 18, line 1, after "claim 42," insert -- wherein --.

Signed and Sealed this

Twenty-fifth Day of March, 2008

JON W. DUDAS  
*Director of the United States Patent and Trademark Office*